(12) United States Patent
Linares

(10) Patent No.: US 8,438,981 B2
(45) Date of Patent: May 14, 2013

(54) PALLET DESIGN WITH BUOYANT CHARACTERISTICS

(75) Inventor: Miguel A. Linares, Bloomfield Hills, MI (US)

(73) Assignee: Oria Collapsibles, LLC, Auburn Hills, MI (US)

( * ) Notice: Subject to any disclaimer, the term of this patent is extended or adjusted under 35 U.S.C. 154(b) by 0 days.

(21) Appl. No.: 13/217,670

(22) Filed: Aug. 25, 2011

(65) Prior Publication Data

US 2011/0303128 A1 Dec. 15, 2011

Related U.S. Application Data

(63) Continuation-in-part of application No. 13/081,953, filed on Apr. 7, 2011, which is a continuation-in-part of application No. 12/608,512, filed on Oct. 29, 2009, now Pat. No. 8,146,516, which is a continuation-in-part of application No. 12/414,017, filed on Mar. 30, 2009, now Pat. No. 8,196,527, and a continuation-in-part of application No. 12/467,601, filed on May 18, 2009, now abandoned, which is a continuation-in-part of application No. 12/414,017.

(60) Provisional application No. 61/328,682, filed on Apr. 28, 2010, provisional application No. 61/074,306, filed on Jun. 20, 2008, provisional application No. 61/377,205, filed on Aug. 26, 2010.

(51) Int. Cl.
*B65D 19/38* (2006.01)

(52) U.S. Cl.
USPC .................... 108/57.22; 108/57.25

(58) Field of Classification Search .......... 108/57.25, 108/51.3, 90, 902, 57.26, 57.27, 57.28, 57.34, 108/51.11, 55.1, 55.5; 248/346.02; 206/386, 206/600, 595, 598
See application file for complete search history.

(56) References Cited

U.S. PATENT DOCUMENTS

| 1,557,935 A | 10/1925 | Henroz |
| 2,383,736 A | 8/1945 | Rembert et al. |
| 2,477,852 A | 8/1949 | Bacon |

(Continued)

FOREIGN PATENT DOCUMENTS

| DE | 19541243 A1 | 5/1997 |
| JP | 02139341 A | 5/1990 |

(Continued)

*Primary Examiner* — Jose V Chen
(74) *Attorney, Agent, or Firm* — Gifford, Krass, Sprinkle, Anderson & Citkowski, P.C.; Douglas J. McEvoy

(57) ABSTRACT

A pallet exhibiting a three dimensional shaped and buoyant inducing body with enhanced load supporting capabilities. The body exhibits a rectangular profile and is constructed of at least one of a corrugated paperboard, plastic or composite material and coated with a plasticized spray. An inner core defined within a three dimensional interior of the body is constructed of any plural arrangement of inner extending, interconnected and frame defining components, at least one of the components and/or the outer surfaces being coated with a plasticized spray. The inner constructed core can further include any of a structural paperboard, bamboo, other tubular material, or structural foam. In a further variant, a standard pallet design of upper and lower cross pieces separated by spaced apart bridge pieces is provided, and in which the individual members are each configured with structurally defined inner cores according to any of the above constructions.

20 Claims, 10 Drawing Sheets

U.S. PATENT DOCUMENTS

| | | |
|---|---|---|
| 2,709,559 A | 5/1955 | Geisler |
| 2,913,206 A | 11/1959 | Paris |
| 2,914,282 A | 11/1959 | Budd |
| 3,002,249 A | 10/1961 | Jackson |
| 3,157,910 A | 11/1964 | Schlipphak |
| 3,223,379 A | 12/1965 | Erickson |
| 3,226,764 A | 1/1966 | Hostettler |
| 3,310,616 A | 3/1967 | Beary |
| 3,382,550 A | 5/1968 | Smith et al. |
| 3,412,439 A | 11/1968 | Baker |
| 3,416,203 A | 12/1968 | Ozenne et al. |
| 3,448,496 A | 6/1969 | Arnold et al. |
| 3,556,886 A | 1/1971 | Reusser |
| 3,568,912 A | 3/1971 | de Simas |
| 3,580,190 A | 5/1971 | Fowler |
| 3,587,479 A | 6/1971 | Geschwender |
| 3,590,446 A | 7/1971 | Sonneville |
| 3,659,986 A | 5/1972 | Gelbman |
| 3,664,272 A | 5/1972 | Sanders |
| 3,675,595 A | 7/1972 | Sullivan |
| 3,710,733 A | 1/1973 | Story |
| 3,719,157 A | 3/1973 | Arcocha et al. |
| 3,720,176 A | 3/1973 | Munroe |
| 3,724,979 A | 4/1973 | Maringer et al. |
| 3,733,157 A | 5/1973 | Hendry |
| 3,801,255 A | 4/1974 | Meyer et al. |
| 3,814,778 A | 6/1974 | Hosoda et al. |
| 3,832,955 A | 9/1974 | Pottinger et al. |
| 3,859,021 A | 1/1975 | Kleiber |
| 3,873,257 A | 3/1975 | Vanotti |
| 3,897,186 A | 7/1975 | Farfor |
| 3,920,369 A | 11/1975 | Boehringer et al. |
| 3,942,926 A | 3/1976 | Bulloch, Jr. |
| 3,955,613 A | 5/1976 | Lund |
| 3,981,956 A | 9/1976 | Redmer et al. |
| 3,982,057 A | 9/1976 | Briggs et al. |
| 3,982,874 A | 9/1976 | Nobbe |
| 3,989,090 A | 11/1976 | Kawai |
| 4,063,864 A | 12/1977 | Oberwelland et al. |
| 4,068,993 A | 1/1978 | Dacey et al. |
| 4,105,383 A | 8/1978 | Hanson |
| 4,197,065 A | 4/1980 | Di Rosa |
| 4,220,100 A | 9/1980 | Palomo et al. |
| 4,279,583 A | 7/1981 | Martin, Sr. |
| 4,312,152 A | 1/1982 | Drury et al. |
| 4,369,024 A | 1/1983 | Blackwood et al. |
| 4,413,964 A | 11/1983 | Winstead |
| 4,456,449 A | 6/1984 | Schubert et al. |
| 4,507,348 A | 3/1985 | Nagata et al. |
| 4,520,746 A | 6/1985 | Walters et al. |
| 4,597,338 A | 7/1986 | Kreeger |
| 4,611,978 A | 9/1986 | Sangiorgi |
| 4,715,294 A | 12/1987 | Depew |
| 4,758,148 A | 7/1988 | Jidell |
| 4,802,836 A | 2/1989 | Whissell et al. |
| 4,819,449 A | 4/1989 | Curti et al. |
| 4,829,909 A | 5/1989 | Mandel |
| 4,832,587 A | 5/1989 | Rensen |
| 4,836,762 A | 6/1989 | Davis, Jr. |
| 4,843,976 A | 7/1989 | Pigott et al. |
| 4,923,661 A | 5/1990 | Russo |
| 4,931,340 A | 6/1990 | Baba et al. |
| 5,023,037 A | 6/1991 | Zullig |
| 5,032,072 A | 7/1991 | Heuschkel |
| 5,035,594 A | 7/1991 | Murayama et al. |
| 5,042,396 A * | 8/1991 | Shuert .................. 108/57.25 |
| 5,076,176 A | 12/1991 | Clasen |
| 5,080,840 A | 1/1992 | Jost et al. |
| 5,082,712 A | 1/1992 | Starp |
| 5,143,778 A | 9/1992 | Shuert |
| 5,171,586 A | 12/1992 | Heath |
| 5,205,221 A | 4/1993 | Melin et al. |
| 5,290,165 A | 3/1994 | Pitha |
| 5,304,050 A | 4/1994 | Vismara |
| 5,320,048 A | 6/1994 | Feiner |
| 5,365,858 A | 11/1994 | Kuhns |
| 5,368,466 A | 11/1994 | Hehl |
| 5,382,152 A | 1/1995 | Ravera et al. |
| 5,391,387 A | 2/1995 | Peters |
| 5,395,227 A | 3/1995 | Huggins, Sr. et al. |
| 5,401,456 A | 3/1995 | Alesi, Jr. et al. |
| 5,423,428 A | 6/1995 | Selz |
| 5,445,514 A | 8/1995 | Heitz |
| 5,451,157 A | 9/1995 | Gimenez |
| 5,473,995 A | 12/1995 | Gottlieb |
| 5,476,048 A | 12/1995 | Yamashita et al. |
| 5,551,353 A | 9/1996 | Fiedler |
| 5,579,686 A | 12/1996 | Pigott et al. |
| 5,605,102 A | 2/1997 | Simpson |
| 5,612,064 A | 3/1997 | Kosman |
| 5,687,652 A | 11/1997 | Ruma |
| 5,709,913 A | 1/1998 | Andersen et al. |
| 5,846,576 A | 12/1998 | Braungardt et al. |
| 5,868,080 A | 2/1999 | Wyler et al. |
| 5,890,437 A | 4/1999 | Hill |
| 6,093,011 A | 7/2000 | Kosman |
| 6,209,464 B1 | 4/2001 | Elder |
| 6,224,363 B1 | 5/2001 | Mahan et al. |
| 6,250,234 B1 * | 6/2001 | Apps .................. 108/57.25 |
| 6,294,114 B1 | 9/2001 | Muirhead |
| 6,357,364 B1 | 3/2002 | Maloney et al. |
| 6,357,366 B1 | 3/2002 | Frankenberg |
| 6,524,426 B1 | 2/2003 | St. John et al. |
| 6,530,330 B2 | 3/2003 | Sepe et al. |
| 6,530,769 B1 | 3/2003 | Rondeau et al. |
| 6,569,509 B1 | 5/2003 | Alts |
| 6,582,216 B2 | 6/2003 | Kosman |
| 6,598,541 B2 | 7/2003 | Vilkki |
| 6,655,299 B2 | 12/2003 | Preisler et al. |
| 6,705,237 B2 | 3/2004 | Moore, Jr. et al. |
| 6,719,551 B2 | 4/2004 | Polk, Jr. |
| 6,745,703 B2 | 6/2004 | Torrey et al. |
| 6,755,633 B2 | 6/2004 | Miller |
| 6,817,857 B2 | 11/2004 | Spangenberg et al. |
| 6,863,003 B2 | 3/2005 | Grainger |
| 6,900,547 B2 | 5/2005 | Polk Jr. et al. |
| 6,938,559 B2 | 9/2005 | Wullenweber |
| 6,954,982 B2 | 10/2005 | Isle et al. |
| 6,972,144 B2 | 12/2005 | Roth et al. |
| 6,976,437 B2 | 12/2005 | Fisch et al. |
| 7,013,814 B2 | 3/2006 | Modesitt et al. |
| 7,143,564 B2 | 12/2006 | Renck |
| 7,150,621 B2 | 12/2006 | Molin |
| 7,197,989 B2 | 4/2007 | Apps |
| 7,238,073 B2 | 7/2007 | Hendrickson |
| 7,255,551 B2 | 8/2007 | Taylor et al. |
| 7,309,226 B2 | 12/2007 | Hansen et al. |
| 7,458,800 B2 | 12/2008 | Scherer et al. |
| 7,469,643 B2 | 12/2008 | Isle et al. |
| 7,658,958 B2 | 2/2010 | Hansen |
| 7,726,248 B2 | 6/2010 | Shuert |
| 7,804,400 B2 | 9/2010 | Muirhead |
| 7,819,068 B2 | 10/2010 | Apps et al. |
| 8,047,886 B1 | 11/2011 | McLarty et al. |
| 2002/0007770 A1 | 1/2002 | Vilkki |
| 2002/0106483 A1 | 8/2002 | Obeshaw |
| 2002/0148393 A1 | 10/2002 | Milles |
| 2003/0024443 A1 | 2/2003 | Hoshi |
| 2003/0041956 A1 | 3/2003 | Pigott et al. |
| 2003/0070594 A1 | 4/2003 | Isle et al. |
| 2003/0118681 A1 | 6/2003 | Dahl et al. |
| 2003/0136315 A1 | 7/2003 | Kim |
| 2003/0189152 A1 | 10/2003 | Elder et al. |
| 2003/0201561 A1 | 10/2003 | Linares |
| 2004/0007164 A1 | 1/2004 | Herring et al. |
| 2004/0187745 A1 | 9/2004 | Rojas et al. |
| 2005/0076816 A1 | 4/2005 | Nakano |
| 2005/0211139 A1 | 9/2005 | Perrotta et al. |
| 2005/0241548 A1 | 11/2005 | Muirhead |
| 2006/0003044 A1 | 1/2006 | DiNello et al. |
| 2006/0075939 A1 | 4/2006 | Shuert |
| 2006/0130712 A1 | 6/2006 | Wang |
| 2006/0131773 A1 | 6/2006 | Linares et al. |
| 2006/0134254 A1 | 6/2006 | Hansen et al. |
| 2006/0144301 A1 | 7/2006 | Borggaard |
| 2006/0191465 A1 | 8/2006 | Marcellus |
| 2006/0201402 A1 | 9/2006 | Moore et al. |

| | | | |
|---|---|---|---|
| 2006/0235780 A1 | 10/2006 | Carney | |
| 2006/0288915 A1 | 12/2006 | Kulbeth et al. | |
| 2007/0215014 A1 | 9/2007 | Lee | |
| 2007/0283857 A1 | 12/2007 | Dong | |
| 2008/0053596 A1 | 3/2008 | Davies et al. | |
| 2008/0060561 A1 | 3/2008 | Carrasco | |
| 2008/0098935 A1 | 5/2008 | Roth et al. | |
| 2008/0103944 A1 | 5/2008 | Hagemann et al. | |
| 2008/0110377 A1 | 5/2008 | Stevens | |
| 2008/0156234 A1 | 7/2008 | van de Camp | |
| 2008/0196633 A1 | 8/2008 | Ho | |
| 2008/0210140 A1 | 9/2008 | Valentinsson | |
| 2010/0154685 A1 | 6/2010 | Arinstein | |
| 2011/0240800 A1 | 10/2011 | Fox, Jr. | |

FOREIGN PATENT DOCUMENTS

| | | |
|---|---|---|
| JP | 03029744 A | 2/1991 |
| JP | 06156493 A | 6/1994 |
| JP | 06-235780 A | 8/1994 |
| JP | 08034014 A | 2/1996 |
| JP | 08034438 A | 2/1996 |
| JP | 08336866 A | 12/1996 |
| JP | 11079180 A | 3/1999 |
| JP | 11221828 | 8/1999 |
| JP | 2001-328632 A | 11/2001 |
| JP | 2002166940 A | 6/2002 |
| JP | 2003011969 A | 1/2003 |
| JP | 2003-034330 A | 2/2003 |
| JP | 2003-267370 A | 9/2003 |
| JP | 2004090988 A | 3/2004 |
| JP | 2005104562 A | 4/2005 |
| JP | 2006036315 A | 2/2006 |
| JP | 2006036331 A | 2/2006 |
| JP | 2006298403 A | 11/2006 |
| JP | 2006023741 A | 2/2008 |
| JP | 2008087839 A | 4/2008 |
| KR | 20030034370 A | 5/2003 |
| KR | 10-0577441 | 5/2006 |
| KR | 1020090117107 | 11/2009 |
| WO | WO-2006082595 A1 | 8/2006 |

* cited by examiner

PALLET DESIGN WITH BUOYANT CHARACTERISTICS

CROSS REFERENCE TO RELATED APPLICATIONS

This application claims the benefit of U.S. Provisional Application 61/377,205 filed on Aug. 26, 2010. This application is also a continuation-in-part of application Ser. No. 13/081,953 filed Apr. 7, 2011, which claims the benefit of U.S. Provisional Application 61/328,682 filed Apr. 28, 2010 and is also a continuation-in-part of application Ser. No. 12/608,512 filed on Oct. 29, 2009, which in turn is a Continuation-in-part of both application Ser. No. 12/414,017 filed Mar. 30, 2009 and application Ser. No. 12/467,601 filed May 18, 2009. Application Ser. No. 12/467,601 is a Continuation-in-part of application Ser. No. 12/414,017 filed on Mar. 30, 2009 and also claims the benefit of U.S. Provisional Application 61/074,306 filed on Jun. 20, 2008.

FIELD OF THE INVENTION

The present invention discloses a number of variations of buoyant pallet designs, including any variation of wooden, composite wooden, paperboard, composite paperboard, plastic, composite plastic or other material exhibiting any shape or size. More particularly, the present invention includes a number of variations of improved pallet design exhibiting moisture sealant, fire retardant and, notably, buoyant characteristics for providing weight supporting and buoyancy such as during being launched from a ship or dropped from an aircraft.

DESCRIPTION OF THE PRIOR ART

Wooden pallet constructions are well known in the prior art. Problems associated with wooden pallets include degradation of material construction and load bearing capabilities, such also resulting from the pallets becoming wet (and excessively heavy) and degrading over time. Additional problems include the inability to maintain in stacked arrangement volumes of pallets during non-use periods as well as during transport between locations. A further shortcoming of known pallet designs is their inability to function effectively in a combined load carrying and flotation assisting manner, such as when it is desirous to transport a supported load upon a body of water or in a further potential application as an emergency flotation support device, such as for use by personnel.

SUMMARY OF THE PRESENT INVENTION

The present invention discloses a pallet exhibiting a three dimensional shaped and buoyant inducing body with enhanced load supporting capabilities. In each variant, the body exhibits a generally rectangular shaped profile with a given depth, and in which the outer and inner structural defining components are constructed of at least one of a corrugated paperboard, plastic or composite material coated with a plasticized spray.

In one series of variants, an inner core (defined as both the core interior of a selected inner extending component and/or the overall inner three dimensional space established within the pallet shaped body) is constructed of any plural arrangement of inner extending, interconnected and frame defining components, with at least one of the components and/or the outer surfaces being coated with a plasticized spray and with the spray further being applied either prior, during or following assembly of the pallet body. The inner constructed core can further include any of a structural paperboard, bamboo, other tubular material, or structural foam. In a further variant, a standard pallet design of upper and lower cross pieces separated by spaced apart bridge pieces is provided, and in which the individual members are each configured with structurally defined inner cores according to any of the above constructions, with the environmentally sealing and waterproofing plasticized spray being pre or post applied to the individually assembleable components defining the pallet body.

BRIEF DESCRIPTION OF THE DRAWINGS

Reference will now be made to the attached drawings, when read in combination with the following detailed description, wherein like reference numerals refer to like parts throughout the several views, and in which.

DETAILED DESCRIPTION OF THE PREFERRED EMBODIMENTS

As previously described, the present invention discloses a number of variations of buoyant pallet designs, such as including an inner frame like core which is constructed of any material including all variation of wood, composite wood, corrugated paperboard, composite paperboard, plastic, composite plastic and/or other material exhibiting any shape or size not limited to a three dimensional rectangular configuration. The present invention further discloses a number of variations of improved pallet design exhibiting moisture sealant, fire retardant and, notably, buoyant characteristics which include the incorporation of inflatable bladders for providing combined cargo supporting and buoyancy aspects upon a body of water such as during being launched from a ship or dropped from an aircraft. It is further understood that the present invention, while providing buoyancy inducing aspects suitable for supporting a load upon a body of water, is not strictly limited to seaborne applications and the pallet variants described herein are operable in any environment in which enhanced load bearing and environmentally resistive capabilities are sought.

Figure 1:
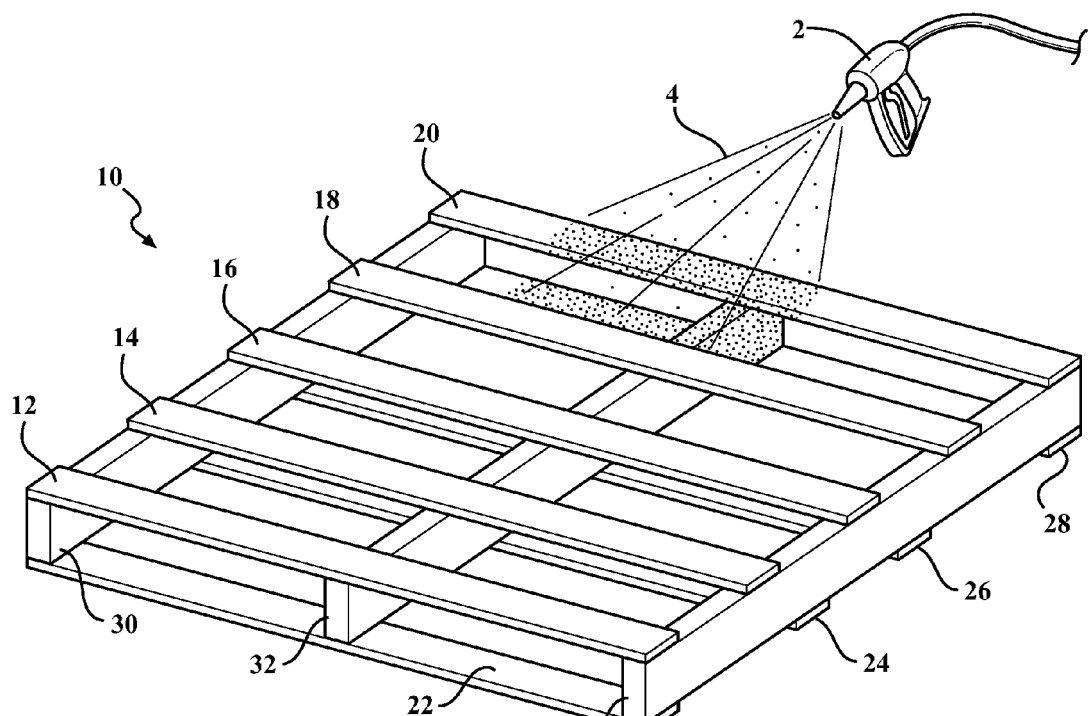
FIG. 1 is a first perspective illustration of a cardboard pallet according to a first embodiment, such as including nine upper and lower cross pieces separated by three bridging and separating pieces and which is coated with a polymeric spray, such as flecked with urethane, and/or an ISO polymeric material with fire retardant properties.

The above said, and referring initially to FIG. 1, a first perspective illustration is generally provided at 10 of a cardboard (also termed a rigid paperboard or corrugated type paperboard material) pallet according to a first embodiment, and such as which can be constructed so as to include a total of nine cross pieces, including five upper pieces 12, 14, 16, 18 and 20 and four additional lower pieces 22, 24, 26 and 28, these being separated by three spaced apart and crosswise extending separating pieces 30, 32 and 34. Although not clearly shown, it is envisioned that the upper, lower and cross pieces can be inter-assembled using various molding techniques or other fasteners, such as chemical fasteners in the form of heat bonding and/or the provision of adhesives in order to promote bonding between the various members.

Figure 2:
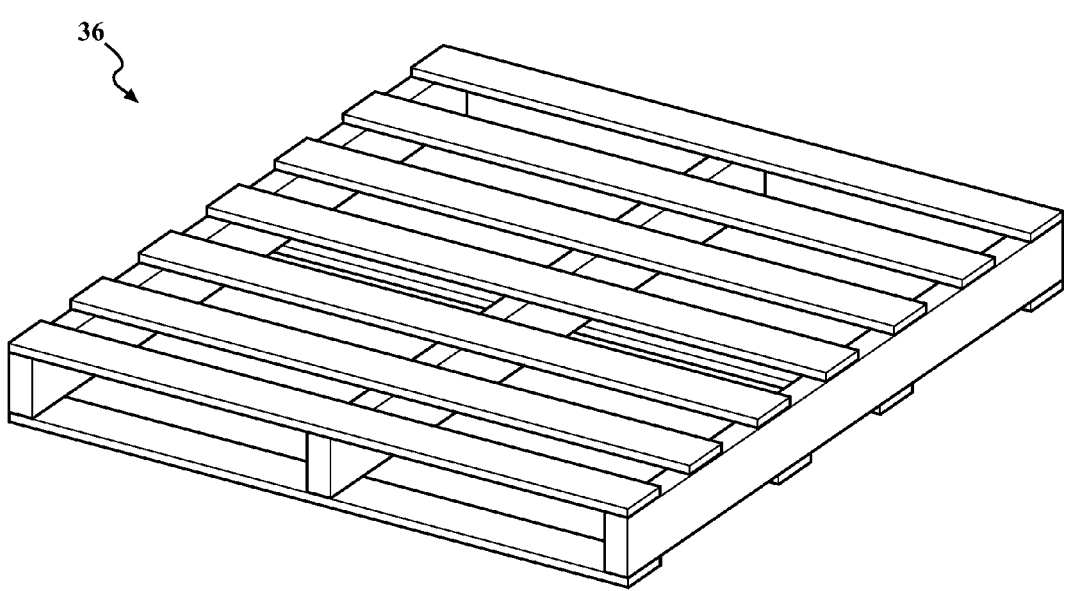
FIG. 2 is a further perspective illustration of a variation of cardboard pallet exhibiting eleven crosspieces.

The upper, lower and bridging pieces are constructed of a corrugated paperboard material, and which is constructed according to any known manufacturing or forming process, and which are coated with a polymeric spray, such as flecked with urethane, and/or an ISO polymeric material with fire retardant properties (see further spray gun 2 applying an aerated flecked polymeric spray 4). FIG. 2 is a further perspective illustration, generally at 36, of a variation of the cardboard pallet also shown at 10, with the exception that it exhibits a total of eleven crosspieces (including seven upper and four lower) again separated by three crosswise extending and spaced apart bridging pieces.

The coating protocols described herein can include, but are not limited to, pre-coating applications applied to each of the multi (typically three) plies of the paperboard or cardboard material, such as prior to the plies being formed into the corrugated planar sheets and/or when being subsequently formed into the various individual elongated and three dimensional bridging or separating pieces, as will be subsequently described in furthering detail. The coating options alternatively or additionally include applying to all of the exterior surfaces of the eventually formed pallet, either or all of before, during and/or after finished assembly, this again in order to provide both waterproofing and mildew, anti-microbial resistance, the lack of such otherwise tending to cause the paperboard material to gain significant weight through the entrainment of water, as well as degrading its weight bearing properties and useful life.

Figure 3:
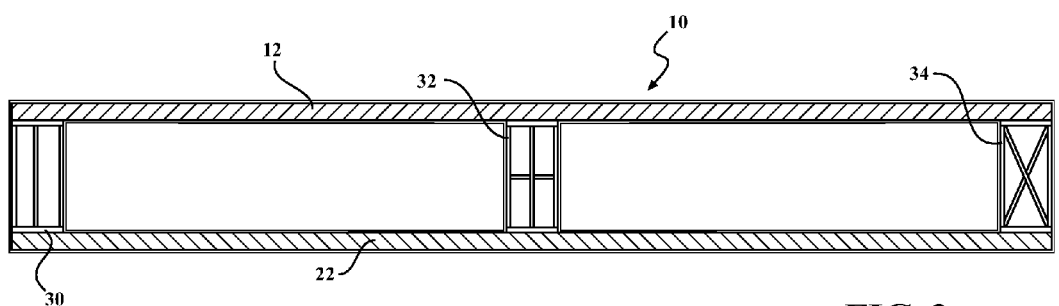
FIG. 3 is a cutaway illustration of a pallet and exhibiting examples of inner core construction associated with each of the three bridging and separating pieces.

Referring now to FIG. 3, a generally end cutaway illustration is shown of a pallet, such as again depicted at 10, and which exhibits examples of inner (otherwise hollow) core construction associated with each of the three bridging and separating pieces 30, 32 and 34. As shown in cutaway cross section, each of the bridging pieces includes a variation of internal corrugated paperboard construction, with the first bridging piece 30 exhibiting an "I" shape plurality of vertical ribs with outer spaced and vertically extending frame members which collectively establish a beam type inner core, with the second piece 32 a cross or grid rib shape encased within an outer frame, and the third piece 34 a diagonal rib shaped element likewise encased within a rectangular outer frame.

As previously indicated, the desired spray coating can be applied at either or all of prior, during and following assembly of the typically three layer corrugated plies into the individual planar members in turn cut and assembled upper and lower pieces (such as again 12-20 and 22-28), as well as the cross sectional extending pieces 30, 32 and 34. The top and bottom extending pieces (represented at 12 and 22 in FIG. 3) are not shown in cutaway but can also exhibit any arrangement of inner core defining grids not limited to those exemplified at 30, 32 and 34.

Figure 4:
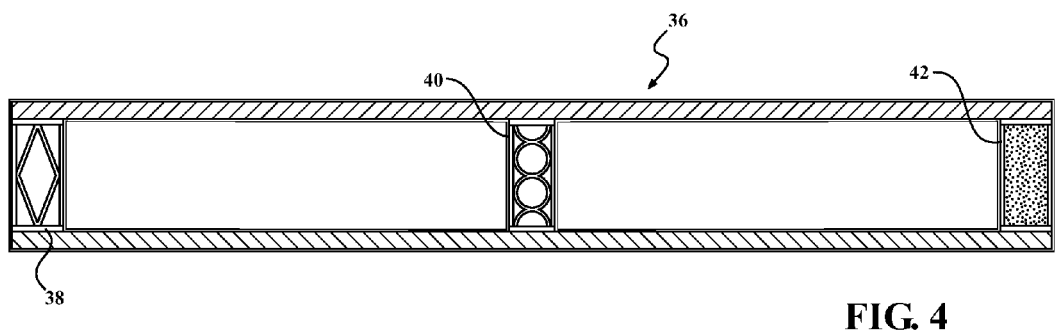
FIG. 4 is another cutaway illustration similar to FIG. 3 and depicting a further plurality of possible core constructions associated with the bridging and separating pieces.

FIG. 4 is another cutaway illustration similar to FIG. 3 and depicting a further plurality of possible core constructions, such as referenced by bridging pieces 38, 40 and 42 associated with the pallet construction 36 in FIG. 2. These notably include the first piece 38 exhibiting a diamond (also dual "V") shaped inner core configuration incorporated within an outer rectangular and form defining frame, a second piece 40 depicting a plurality of stacked and circular core defining elements within a similar outer frame (such as including tubing or bamboo or any other composite type element) and third piece 42 a standard box or rectangular shaped frame configuration alone and exhibiting a solid inner core of any type of expanding or structural foam. Beyond the examples of FIGS. 4-5, an unlimited number of alternate configured structural supporting interior configurations can be constructed for achieving enhanced load bearing capabilities associated with the upper, lower and bridging/cross pieces.

Figure 5:
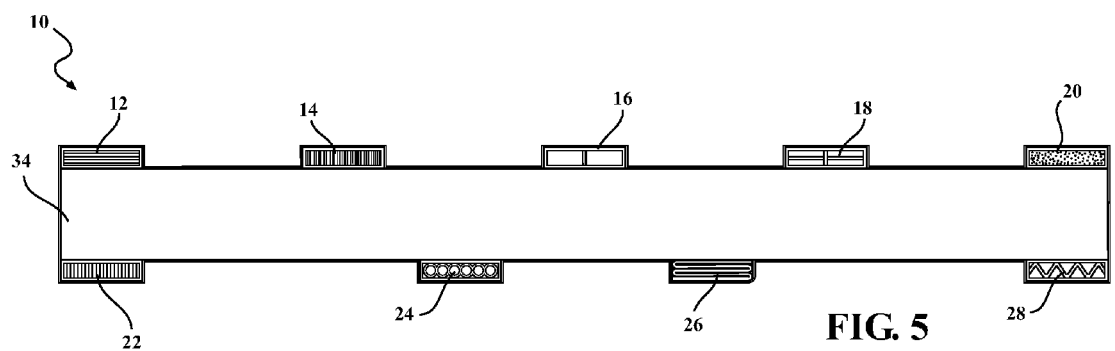
FIG. 5 is a rotated illustration in which the cross pieces are depicted in cross sectional cutaway exhibiting varying core configurations.
Figure 6:
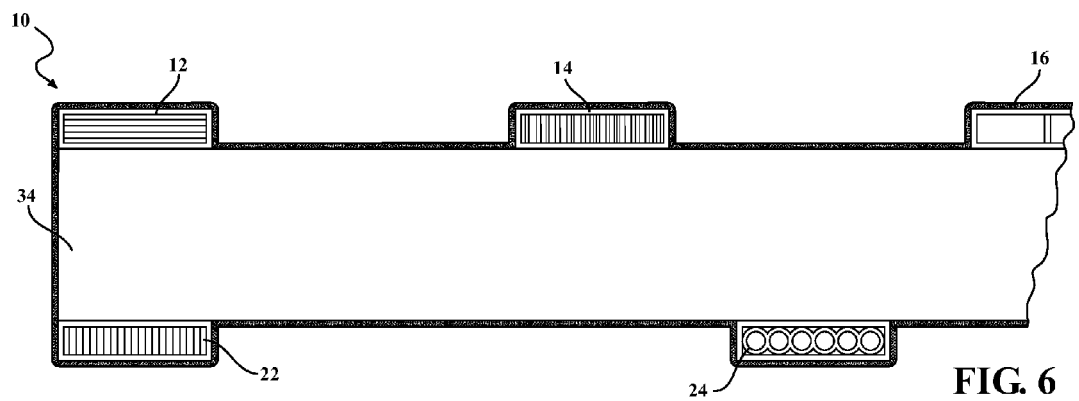
FIG. 6 is a first enlarged end section of FIG. 5 and better illustrating a subset variation of cross piece core constructions.
Figure 7:
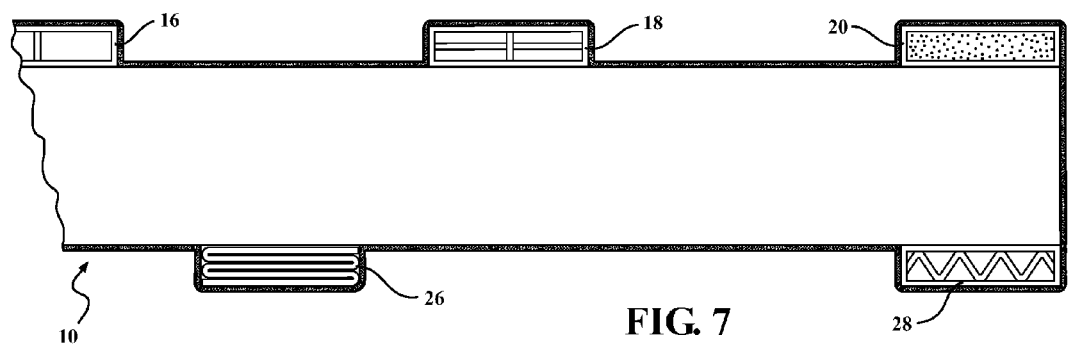
FIG. 7 is a second enlarged and opposite end section of FIG. 5 better illustrating a corresponding subset variation of cross piece core constructions.

Referring now to FIG. 5, in combination with enlarged end sections of FIGS. 6 and 7, a series of rotated and partially end cutaway illustrations are depicted of the pallet 10 of FIG. 1, and in which the upper and lower cross pieces are depicted in cross sectional cutaway exhibiting varying core configurations, with the various intermediate bridging pieces, e.g. at 34, illustrated in solid. The cutaway illustrations include first upper cross piece 12 exhibiting a horizontal laminated cardboard, second upper cross piece 14 exhibiting a honeycomb structure, third upper cross piece 16 a vertical ribbing construction, fourth upper cross piece 18 a modified vertical ribbing construction with interlaced or interconnecting horizontal laminated cardboard and fifth upper cross piece 20 again a solid expanding or structural foam.

First lower cross piece 22 likewise exhibits a vertical laminated cardboard construction, second lower cross piece 24 any type of horizontal end to end positioned bamboo or other type tubing, third lower cross piece 26 a folded cardboard construction and, finally, fourth lower cross piece 28 a continuous "V" channel ribbing. As with the prior variants of FIGS. 3-4, each of the upper 12-20 and lower 22-28 cutaway profiles are bound within an outer and cross sectional profile defining frame, with each of the outer and inner frame members each again being constructed of three ply corrugated material or other suitable corrugated construction.

Without limitation, either or both the bridging pieces and/or the upper and lower cross pieces can be constructed of differing materials and core architectures, this including modifying the construction of various or subset cross pieces relative to the bridging pieces (e.g. the upper and lower crosspieces possibly exhibiting differing constructions and which can be the same as or different from the individual constructions of the bridging pieces). As previously described, it is also envisioned that the individual three dimensional defining upper, lower and intermediate bridging pieces can also be constructed of polymeric or composite materials (such as which can combine aspects of corrugated paperboard and polymeric components).

Figure 8:
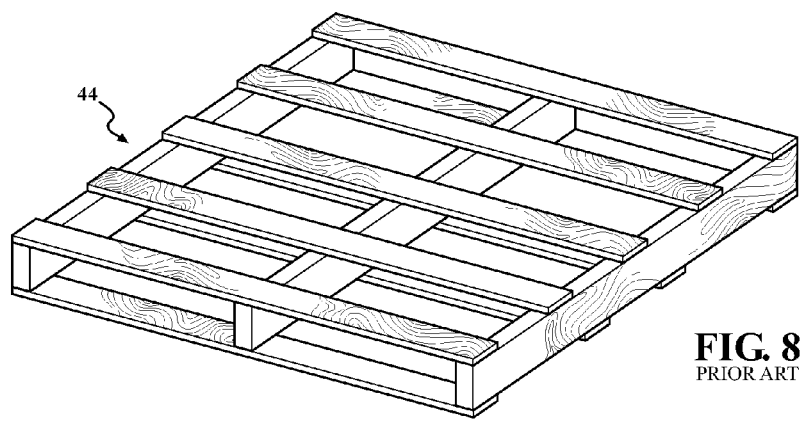
FIG. 8 is a perspective illustration of a standard wooden pallet similar to the construction identified in FIG. 1.
Figure 9:
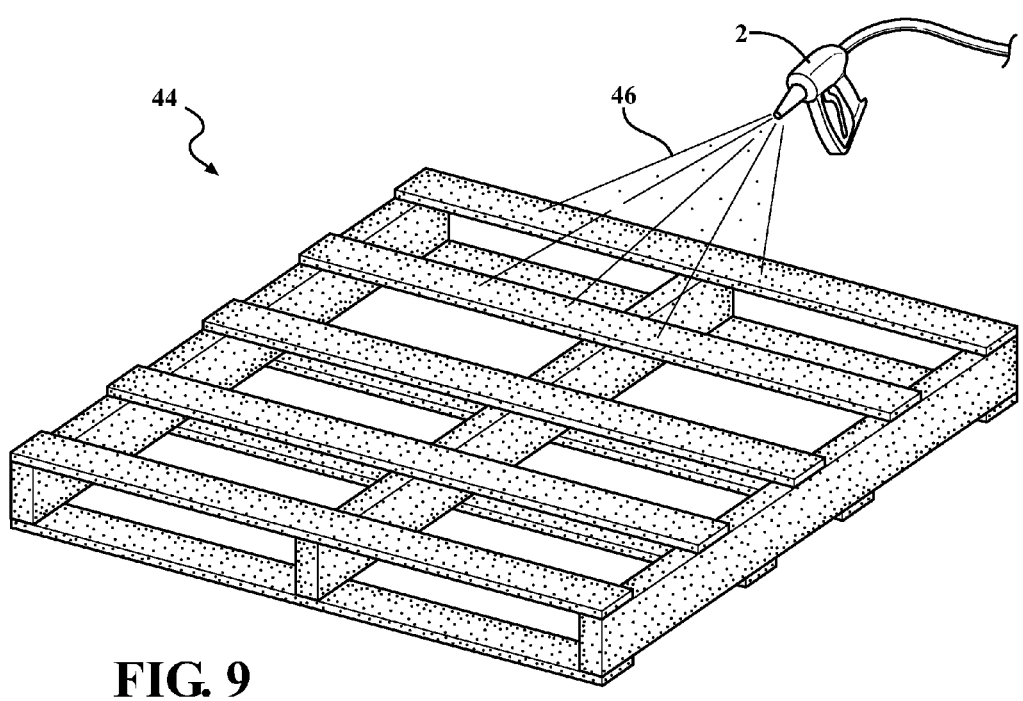
FIG. 9 is a succeeding illustration to FIG. 8 and depicting a plasticized spray which is coated over the wooden composition in order to moisture seal the same, such as to provide anti-microbial protection against wood degradation, fire resistant properties, and to avoid weight increase due to entrained water.

Referring to FIG. 8, a perspective illustration is generally shown at 44 of a standard wooden pallet according to the Prior art which is similar to the construction identified in FIG. 1, it being further understood that any type of wooden material can be incorporated into this pallet design and which, by itself, would include any pallet known in the prior art. FIG. 9 is a succeeding illustration to FIG. 8 and which further depicts a plasticized spray 46 which is coated over the wooden composition in order to moisture seal the same, such as to provide anti-microbial protection against wood degradation, fire resistant properties, and to avoid weight increase due to entrained water.

Figure 10:
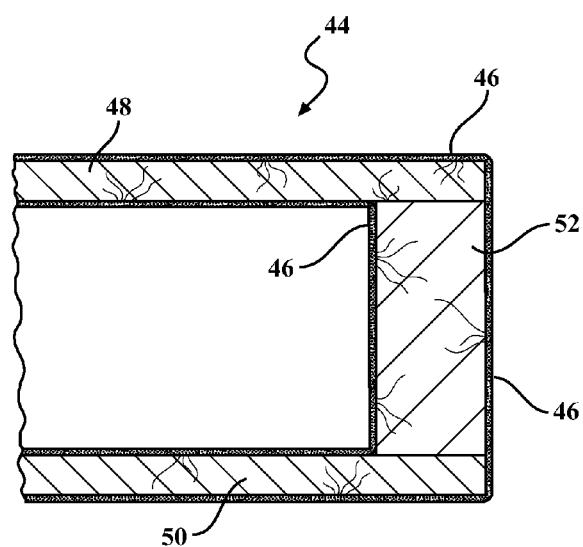
FIG. 10 is an enlarged side cutaway of the pallet in FIG. 9 and further illustrating the coating of the wooden pallet.

FIG. 10 is an enlarged side cutaway of the pallet in FIG. 9 and further illustrating the coating 46 applied to all of the exterior surfaces of previously assembled wooden pallet 44 and including such as selected top piece 48, bottom piece 50 and end bridging piece 52. The coating 46 can, similar to that previously described in relation to the rigid paperboard variant of FIG. 1, include such as a waterproofing and anti-microbial protecting plasticized spray and which may additionally incorporate fire retardant properties within its chemical recipe. It is also again understood that the variant of FIGS. 8-10 is not limited to wood, but can again include any other type of material including natural, synthetic or composite.

Figure 11:
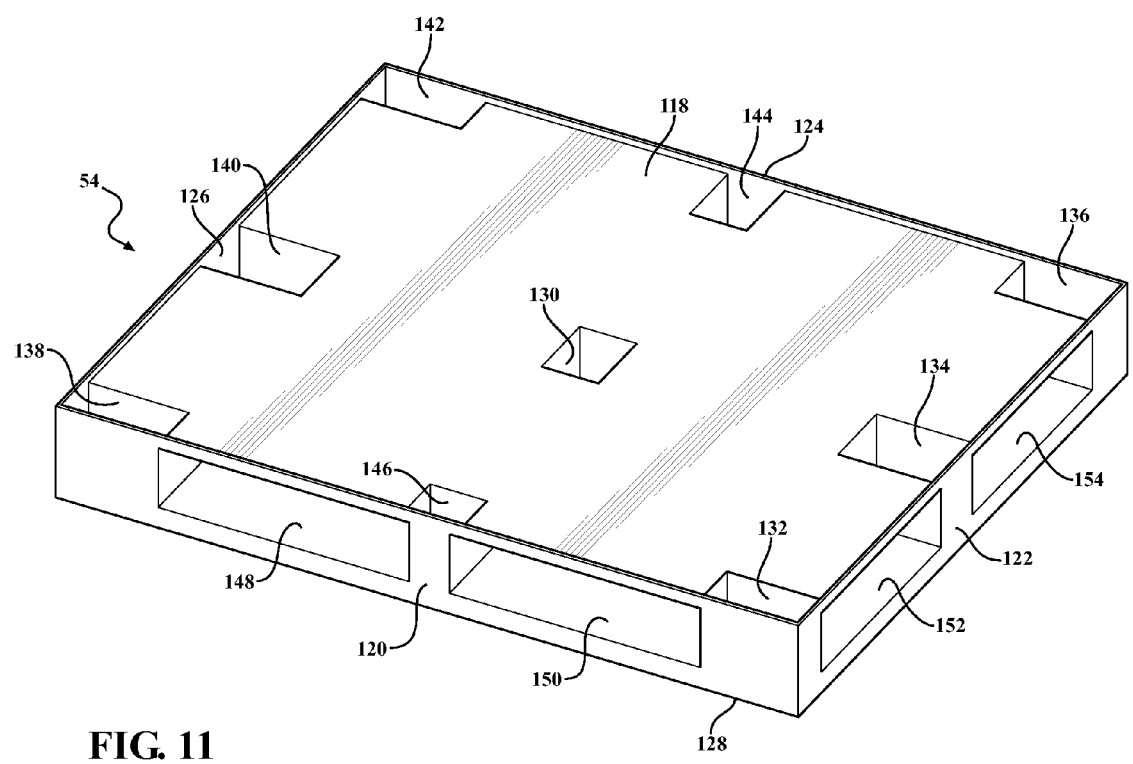
FIG. 11 is a perspective illustration of another variant of rigid pallet exhibiting a cardboard outer shell in relation to that depicted in FIG. 1.
Figure 12:
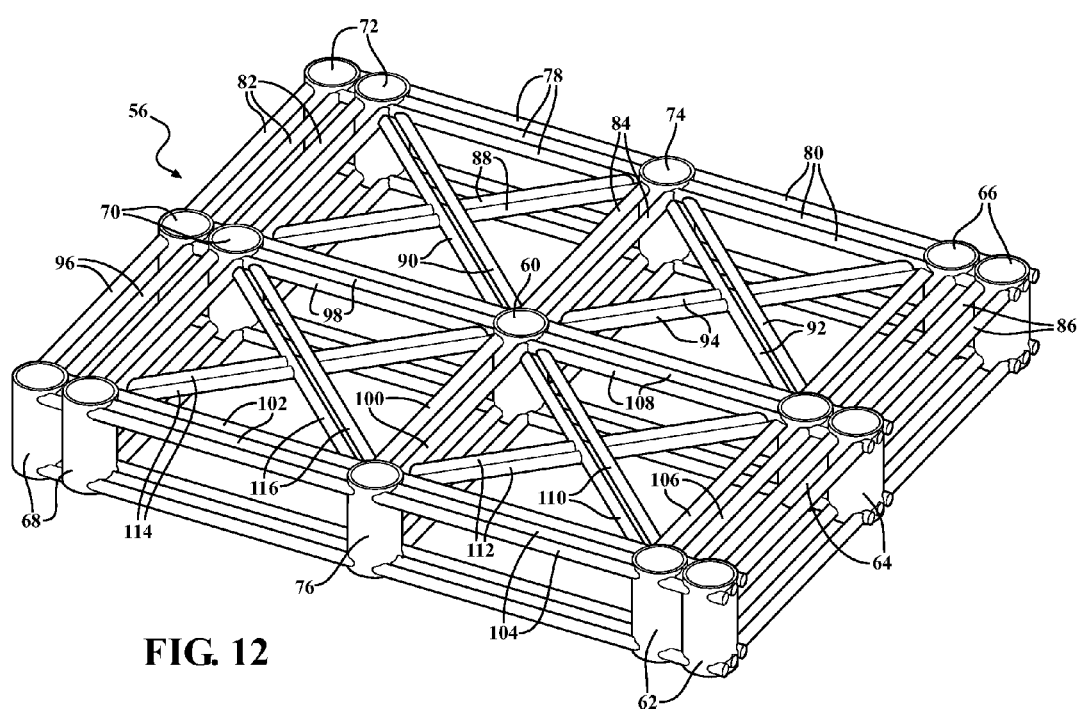
FIG. 12 is a succeeding illustration to FIG. 11 and depicting an inner frame constructed of any type of natural, synthetic or composite materials.

Referring to FIG. 11 a perspective illustration is generally shown at 54 of another variant of rigid pallet and such as which exhibits a three dimensional and substantially rectangular/planar shaped body exhibiting a cardboard or other suitable corrugated and/or polymeric/polymeric composite outer shell in relation to that depicted in FIG. 1. In combination with FIG. 11, FIG. 12 depicts a succeeding illustration 56 of an inner frame constructed of any type of natural, synthetic or composite materials, such as any type of bamboo framing or other tubing and in which a plurality of such elements are properly sized and assembled into a three dimensional frame prior to being encapsulated or otherwise encased within the outer shell 56.

The inner frame 56 as illustrated includes a central most vertical extending cylinder 60 which can again include any of bamboo sections, other organic materials, as well as corrugated or polymeric/polymeric-composite, the center-most cylinder 60 surrounded by perimeter edge extending and like shaped support cylinders, both in pairs at 62, 64, 66, 68, 70, 72 and singularly at 76. Additional bamboo or other organic/inorganic tubing portions (such as again bamboo, corrugated paper, plastic, plastic composition, et seq) are further represented by upper and lower spaced and matching planar configurations including plural lengths 78-116 established in both outer perimeter and inner grid/diagonal grid defining fashion between the center and perimeter located vertical cylinder supports 60-76 and which collectively define the upper layer. As is clearly seen in FIG. 12, an identical and depth spaced arrangement defines a lower layer collection of interlocking tubing portions engaging lower locations of the vertical cylinder supports 60-76, and which are not numbered for purposes of clarity of presentation.

The three dimensional and substantially planar and rectangular shaped outer corrugated shell 54 depicted in FIG. 11 further includes a collection of interior configurations and apertures defined within a three dimensional assembleable upper half exhibited by a planar top surface 118 and outer perimeter interconnecting and downwardly extending edges. The top 118 is assembled in inwardly seating and nesting fashion relative to the rectangular defined sides 120, 122, 124, and 126 which extend upwardly around a perimeter defined by a planar extending bottom half 128 as shown in FIG. 11.

The arrangement of vertically extending apertures defined in three dimensional top 118 includes a center most aperture 130 (defined by inner rectangular shaped and depth extending perimeter for seating center most vertical tubular cylinder 60), this in combination with perimeter edge extending and three sided inwardly notched and depth extending apertures 132-146 (each of these achieving an overall rectangular shape when seated against the inwardly facing surfaces of the outer sides 120-126), the perimeter located apertures 132-146 being arranged in corresponding and mating alignment with the perimeter extending cylinders 62-76. Additional and side accessible forklift apertures are further depicted on selected sides 120 and 122, see pairs of generally elongated/rectangular apertures at 148 & 150 and 152 & 154, respectively, and which are arranged in offset fashion with respect to the placement of the perimeter proximate extending vertical seating apertures 132-146. As best understood, the forklift receiving slots or apertures are actually mating inner perimeter wall patterns formed in the nesting sides of the top and bottom halves such that, upon completed assembly of the pallet, adequate clearance is provided for receiving the inserted forks.

Figure 13:
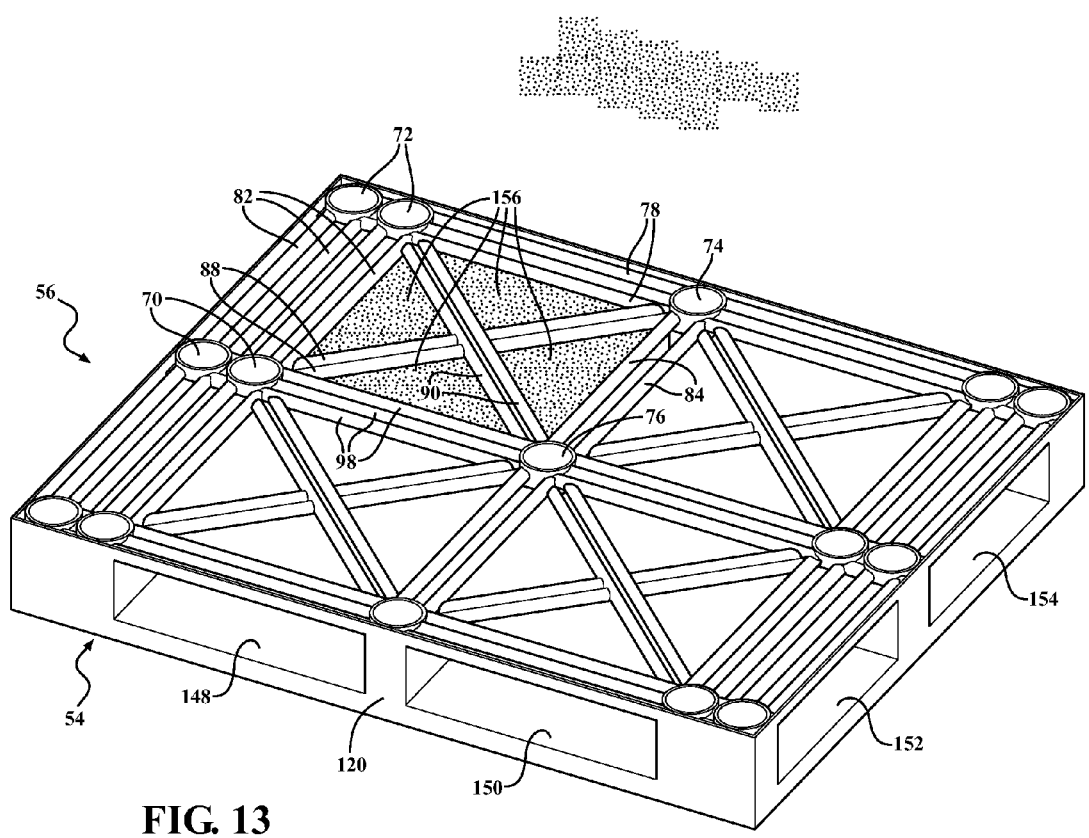
FIG. 13 is a succeeding illustration illustrating the manner in which the frame of FIG. 12 is fitted within the outer shell of FIG. 11, with top removed.

FIG. 13 is a succeeding illustration illustrating the manner in which the frame 56 of FIG. 12 is fitted within the outer shell 54 of FIG. 11, with depth extending top 118 removed. Following installation of the inner structural frame 56 within the open interior of the outer rectangular and three dimensional shell 54, a remaining inner space established between the various tubing and cylinder components of the frame 56 and perimeter edge and upper and lower interior surfaces of the outer shell 54 can further be filled with an expanding or structural foam.

This is representatively shown in FIG. 13 by fill level 156 consisting of a volume of structural supporting material poured into the pre-assembled and open top interior of the shell 54 established by the lower half and which is depicted as filling up to the level of the upper tubular network, further depicted by interconnecting portions in one quadrant established by central tubular cylinder 76 and outer cylinders 70, 72 and 74 along with inner selected and referenced structural defining and interconnecting plural tubular members 78, 82, 84, 98 and associated inner diagonal grid members 88 and 90. In this fashion, the infill of additional structural foam can provide additional increase in the structural properties of the overall three dimensional pallet, with it further envisioned that such can be accomplished without interfering or compromising fork access through the lift apertures 148, 150, 152 and 154 (such as through further reconfiguring inner barriers within the shell interior to prevent outflow of the structural foam proximate the individual lift apertures or further by creating an alternate outer shell body which includes fewer or not forklift apertures as a further non-limiting option).

Figure 14:
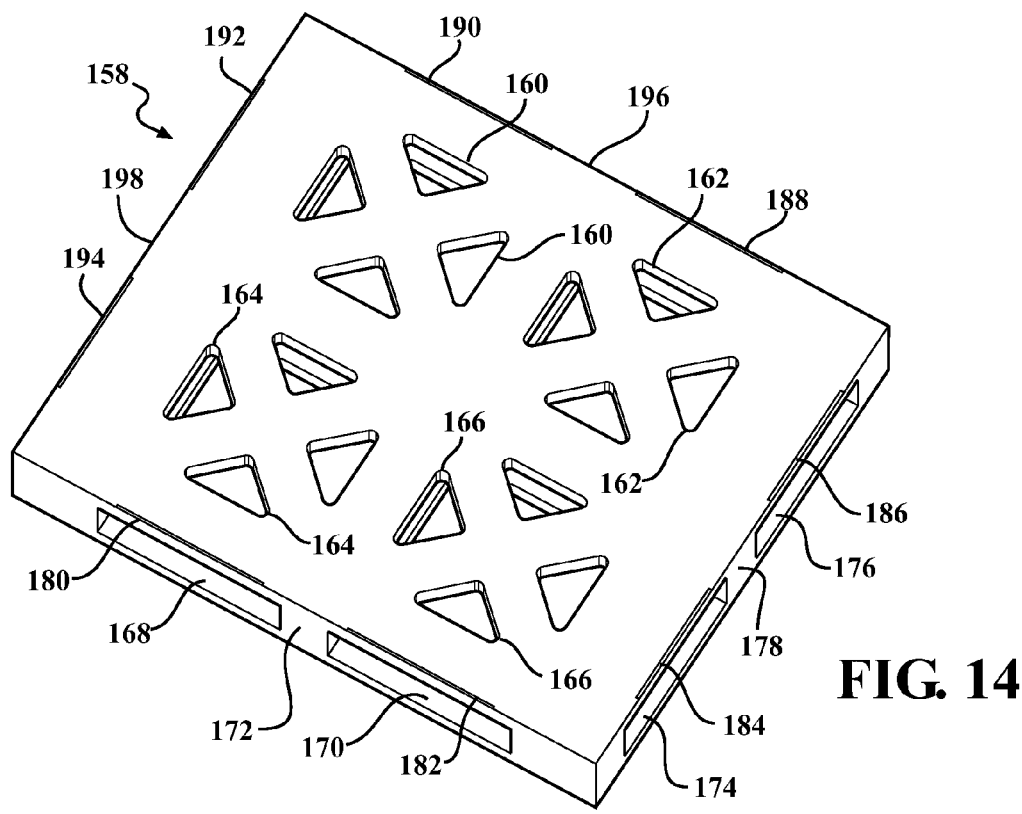
FIG. 14 is another perspective illustration of a rigid pallet construction in which handling and drainage holes are configured through its depth, combined with edge projecting stacking locators defined along each side.

FIG. 14 is another perspective illustration of a three dimensional rectangular shaped and rigid pallet construction 158 (such as constructed of any number of pieces not limited to a two piece nesting arrangement depicted in FIG. 11 or an intricate one piece molded construction) and in which handling and drainage holes are arranged in individual plural defined patterns and include sub-pluralities of such as pseudo triangular shaped apertures portions, see at each of 160, 162, 164 and 166, which are configured through its depth in generally opposing and spaced fashion as depicted, this combined with edge defined communicating apertures 168 and 170 (associated with first selected side 172) and further such apertures 174 and 176 associated with a further connected side 178. As with previous disclosed embodiments, additional arrangements of elongated and projecting ridges, protrusions or stacking locators are provided and which are depicted in spaced apart and edge extending pairs 180 & 182, 184 & 186, 188 & 190 and 192 & 194 defined along each of sides 172 and 178, as well as additional interconnected sides 196 and 198.

Figure 15:
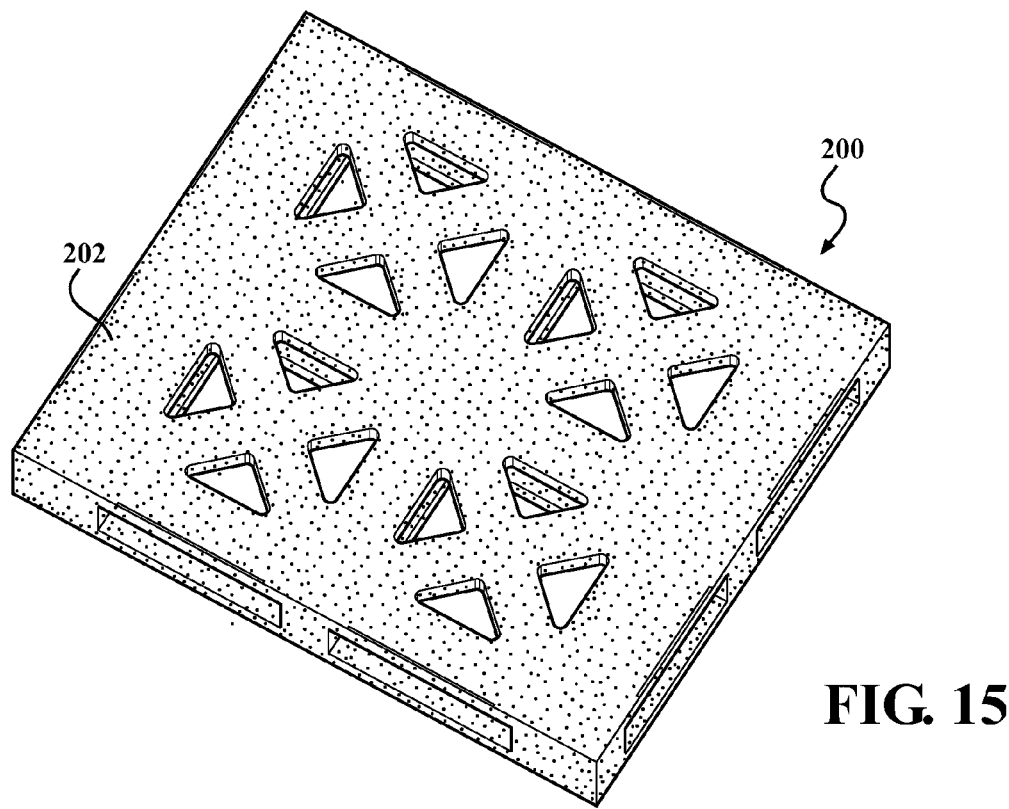
FIG. 15 is a succeeding illustration of the pallet of FIG. 14, similar to that depicted in the prior embodiment of FIG. 9, and in which a plasticized spray is coated over the wooden composition in order to moisture seal the same, such as to provide anti-microbial protection against wood degradation, fire resistant properties, and to avoid weight increase due to entrained water.

FIG. 15 is a succeeding illustration of the pallet of FIG. 14, further shown at 200 and, similar to that depicted in the prior embodiment of FIG. 9, exhibits a plasticized spray 202 coated over the exterior surfaces of the pallet in order to moisture seal the same and providing such as anti-microbial protection against wood degradation (in the case of a wood or corrugated style construction), as well as fire resistant properties, and to avoid weight increase due to entrained water. As with prior embodiments, the no limitations are placed as to the material selection which can be employed in creating the three dimensional pallet construction and which can include any of wood, cardboard/corrugated materials, plastic, composite or the like.

Figure 16:
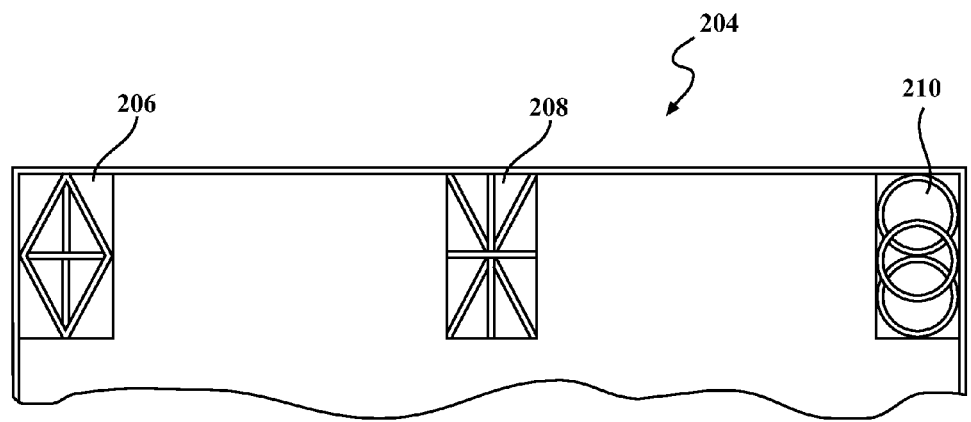
FIG. 16 is a plan view illustration of a pallet such as depicted in FIGS. 11 and 14 and further illustrating, in partial cutaway, possible core architecture configurations of inner vertical posts.
Figure 17:
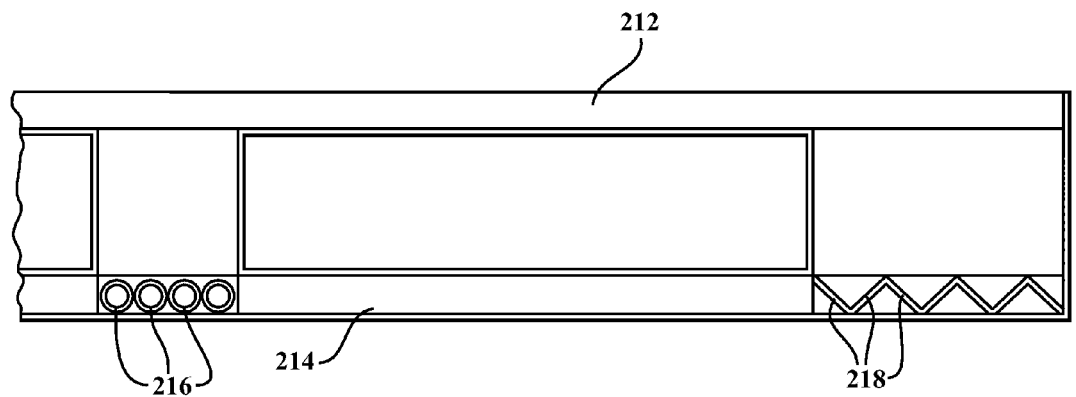
FIG. 17 is rotated plan view of the pallet in FIG. 16 and illustrating, in likewise partial cutaway, the core configuration of top and bottom decks.

Referring now to FIG. 16, a plan view cutaway illustration is generally shown of an edge portion of a pallet 204, such as depicted in FIGS. 11 and 14 and further illustrating, in partial cutaway, possible core architecture configurations of alternately configured inner vertical posts, these further shown at 206, 208 and 210, and which are similar in respects to the patterns previously described in the variants of FIGS. 3 and 4, again including any type of cardboard, plastic or composite material in which the vertical posts can exhibit any type of tubing, bamboo or other suitable construction. Finally, FIG. 17 is rotated plan view of the pallet in FIG. 16 and illustrating, in likewise partial cutaway, core configurations associated with top 212 and bottom 214 decks, the bottom deck 214 further depicting examples of plural bamboo or like tubular members, at 216, arranged in plural parallel extending fashion, as well as any type of supporting structure which can include a plurality of interconnected legs 218 arranged in a "V" shaped repeating pattern. In any variant previously described, it is further envisioned and understood that appropriately configured straps, band or the like can be incorporated into the body for assisting in securing cargo items placed upon the upper supporting surface of the pallet.

Having described my invention, other and additional preferred embodiments will become apparent to those skilled in the art to which it pertains, and without deviating from the scope of the appended claims.

I claim:
1. A pallet comprising:
   a three dimensional and rectangular shaped body including a lower portion defined by a bottom and four upwardly extending and interconnected sides and an upper portion defined by a top and four downwardly extending and interconnecting sides which nest with said upwardly extending sides of said lower portion to create an outer shell;
   an inner frame having a plurality of interconnecting members which is pre-deposited within said lower portion prior to assembly of said upper portion; and
   said inner frame further comprising an interior arranged and vertical extending cylindrical shaped portion surrounded by a plurality of like shaped and perimeter edge extending and spaced apart vertical portions, a network of tubular shaped portions interconnecting said cylindrical shaped portions.

2. The invention as described in claim 1 said vertical cylindrical and elongated interconnecting tubular portions each being constructed of any of a bamboo or other organic/inorganic materials not limited to corrugated paper, plastic, and composites.

3. The invention as described in claim 1, further comprising at least some of said perimeter edge extending and spaced apart vertical portions arranged in pairs.

4. The invention as described in claim 1, an interior of said upper portion further comprising a plurality of depth extending apertures which nest around said vertical cylindrical shaped portions associated with said inner frame.

5. The invention as described in claim 1, further comprising a structural supporting filler material deposited within said lower portion subsequent to placement of said inner frame and prior to installation of said upper portion.

6. The invention as described in claim 1, further comprising a series of fork receiving apertures defined along one or more of said nesting sides.

7. The invention as described in claim 1, further comprising a plasticized spray for environmentally coating at least one of said upper and lower nesting portions and said inner frame.

8. The invention as described in claim 1, said network of tubular shaped portions interconnecting said cylindrical shaped portions further comprising upper and lower spaced layers of interconnecting portions.

9. The invention as described in claim 1, said network of tubular shaped portions interconnecting said cylindrical shaped portions further comprising outer perimeter extending portions and inner diagonal extending portions.

10. The invention as described in claim 1, said body further comprising at least one of a corrugated paperboard or polymeric composite material.

11. A pallet comprising:
    a body having a lower portion and an assembleable upper portion which nests with said lower portion to create a three dimensional outer shell; and
    an inner frame supported upon said lower portion prior to application of said upper portion, said frame including a plurality of vertical extending cylindrical shaped portions which are interconnected by a network of tubular shaped portions including outer perimeter extending portions and inner diagonal extending portions.

12. The invention as described in claim 11, further comprising said lower portion defined by a bottom and four upwardly extending and interconnected sides, said upper portion defined by a top and four downwardly extending and interconnecting sides which nest with said upwardly extending sides of said lower portion.

13. The invention as described in claim 11, said vertical cylindrical and elongated interconnecting tubular portions each being constructed of any of a bamboo or other organic/inorganic materials not limited to corrugated paper, plastic, and composites.

14. The invention as described in claim 11, further comprising at least some of said vertical portions being arranged in perimeter edge extending and paired fashion.

15. The invention as described in claim 11, an interior of said upper portion further comprising a plurality of depth extending apertures which nest around said vertical cylindrical shaped portions associated with said inner frame.

16. The invention as described in claim 11, further comprising a structural supporting filler material deposited within said lower portion subsequent to placement of said inner frame and prior to installation of said upper portion.

17. The invention as described in claim 11, further comprising a series of fork receiving apertures defined along one or more interconnected sides of said body.

18. The invention as described in claim 11, further comprising a plasticized spray for environmentally coating at least one of said upper and lower nesting portions and said inner frame.

19. The invention as described in claim 11, said network of tubular shaped portions interconnecting said cylindrical shaped portions further comprising upper and lower spaced layers of interconnecting portions.

20. The invention as described in claim 11, said body further comprising at least one of a corrugated paperboard or polymeric composite material.

\* \* \* \* \*

UNITED STATES PATENT AND TRADEMARK OFFICE
CERTIFICATE OF CORRECTION

PATENT NO. : 8,438,981 B2  
APPLICATION NO. : 13/217670  
DATED : May 14, 2013  
INVENTOR(S) : Miguel A. Linares Page 1 of 1

It is certified that error appears in the above-identified patent and that said Letters Patent is hereby corrected as shown below:

Title Page:

Item (56) Foreign Patent Documents - Page 3

At column 2, line number 14, Delete "JP 2006023741A", Insert --JP 2008023741A--.

Signed and Sealed this
Fourteenth Day of October, 2014

Michelle K. Lee
*Deputy Director of the United States Patent and Trademark Office*